US011997486B2

(12) United States Patent
Mese et al.

(10) Patent No.: US 11,997,486 B2
(45) Date of Patent: May 28, 2024

(54) METHOD AND SYSTEM OF PROVIDING WIFI CREDENTIALS THROUGH REMOTE INVITATIONS

(71) Applicant: Lenovo (Singapore) Pte. Ltd., New Tech Park (SG)

(72) Inventors: John Carl Mese, Cary, NC (US); Russell Speight VanBlon, Raleigh, NC (US); Nathan J. Peterson, Oxford, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 688 days.

(21) Appl. No.: 16/722,021

(22) Filed: Dec. 20, 2019

(65) Prior Publication Data

US 2021/0195416 A1   Jun. 24, 2021

(51) Int. Cl.
  *H04W 12/062* (2021.01)
  *G06Q 50/12* (2012.01)
  *H04W 4/029* (2018.01)
  *H04W 12/08* (2021.01)
  *H04W 60/04* (2009.01)
  *H04W 84/12* (2009.01)

(52) U.S. Cl.
  CPC .......... *H04W 12/062* (2021.01); *G06Q 50/12* (2013.01); *H04W 4/029* (2018.02); *H04W 12/08* (2013.01); *H04W 60/04* (2013.01); *H04W 84/12* (2013.01)

(58) Field of Classification Search
  None
  See application file for complete search history.

(56) References Cited

U.S. PATENT DOCUMENTS

| | | | |
|---|---|---|---|
| 2005/0125669 A1* | 6/2005 | Stewart | H04L 63/061 713/171 |
| 2007/0162971 A1* | 7/2007 | Blom | H04L 67/303 726/17 |
| 2010/0229216 A1* | 9/2010 | Koga | H04W 12/062 370/315 |
| 2012/0011576 A1* | 1/2012 | Guan | H04L 63/0892 726/7 |
| 2013/0198817 A1* | 8/2013 | Haddad | H04L 63/18 726/5 |
| 2018/0359233 A1* | 12/2018 | Alexander | H04L 63/083 |
| 2018/0359234 A1* | 12/2018 | Kobayashi | G06F 21/31 |
| 2019/0073468 A1* | 3/2019 | Kazerani | H04L 63/107 |
| 2020/0196149 A1* | 6/2020 | Cheng | H04W 48/08 |
| 2020/0204996 A1* | 6/2020 | Longobardi | H04W 12/062 |
| 2020/0245146 A1* | 7/2020 | Cheng | H04L 63/1408 |
| 2020/0274714 A1* | 8/2020 | Suson | H04L 9/3239 |
| 2021/0158639 A1* | 5/2021 | Westra | H04L 9/3271 |

* cited by examiner

*Primary Examiner* — Clemence S Han
(74) *Attorney, Agent, or Firm* — Dean D. Small; The Small Patent Law Group, LLC (57) ABSTRACT

Computer implemented methods, systems, and computer program products are provided including identifying a new reservation from an electronic device for automatic access to a network; conveying the credentials to the electronic device prior to arriving at a structure associated with the network; and granting access to a network once the electronic device is detected by the network.

20 Claims, 7 Drawing Sheets

METHOD AND SYSTEM OF PROVIDING WIFI CREDENTIALS THROUGH REMOTE INVITATIONS

Embodiments of the present disclosure generally relate to automatically providing Wi-Fi credentials to a user with an electronic device.

Today, a traveler frequently requires broadband internet access. Many times, the traveler may find the process of connecting to the wireless network of a hotel, office building, and the like to be a cumbersome task. For example, a traveler may find information for connecting to the wireless network of a hotel with an electronic device. The traveler may find that the process takes while, because the traveler must enter Wi-Fi setup and confirm an understanding of the hotel terms of use for each electronic device. Each device must separately go through similar processes, which may be difficult for travelers that are not savvy with setting up electronic devices. Upon leaving the hotel for a meeting elsewhere, the traveler may discover upon returning to the hotel that the connection to the wireless network must be re-established for continued use. The process for connecting the electronic devices may need to be repeated. The initial process and the repeating of the process may create traveler frustration.

An example of traveler frustration may occur upon checking into an airport for an upcoming flight. A traveler may choose to use the broadband access provided by the airport while waiting to board the airplane. Frequently, the traveler has to go into the settings of the electronic device to select a wireless network from the abundance of wireless networks that are listed as available networks. This can be cumbersome, time consuming, and confusing for the traveler. The traveler may discover that the wireless access includes opting into advertisements that are delivered to the traveler. The advertisements may pop up at inopportune times, such as during a video conference as the traveler's screen is being shared. This experience may create a frustrating experience for the traveler.

Another example of traveler frustration may occur as the traveler has boarded the airplane seeking to use wireless services during the flight. The traveler will then have to sign onto another wireless network. Again, the traveler will have to select the appropriate wireless network from a list of networks. Upon choosing the appropriate network for the wireless network of the plane, the traveler may have to pay for the access to the network. Upon gaining access to the network, the user may be presented a screen detailing terms of use for the wireless network. After straining to read the fine print of the terms of use screen on a mobile phone, the traveler may still not have true access to the network. Oftentimes, a traveler may find that the process may need to be repeated because the mobile phone traveler cannot render any web sites after going through the lengthy, confusing, and cumbersome process.

A need remains for an easier way to provide wireless network access to users needing guest access prior to the guest arrival.

SUMMARY

In accordance with embodiments herein a method is provided that comprises receiving, at an electronic device (ED), pre-authorization network (PN) credentials for access to a wireless network in connection with a scheduled event; and storing the PN credentials in association with the scheduled event, the PN credentials to be utilized to access the network.

Additionally or alternatively, in accordance with aspects herein, the method further comprises storing the PE credentials, on the ED, with one or more of location and date information related to the scheduled event. Additionally or alternatively, in accordance with aspects herein, the receiving further comprises receiving an electronic invitation in connection with the scheduled event, the electronic invitation including the PN credentials and one or more of a location and time associated with the scheduled event. Additionally or alternatively, in accordance with aspects herein, the storing further comprises importing the PN credentials onto a prestored list of credentials associated with different networks, the PN credential including sign and authorization information for the ED and an identifier of the network. Additionally or alternatively, in accordance with aspects herein, the determining further comprises one or more of: i) detecting a SSID for the network, ii) utilizing GPS data to identify when the ED is at a location associated with the scheduled event, iii) determining that a current time corresponds to a time of the scheduled event, and iv) determining that a current location of the ED corresponds to a location of the scheduled event.

Additionally or alternatively, in accordance with aspects herein, the method further comprises generating a request associated with the scheduled event, and receiving an electronic invitation, including the PN credential, in response to the request, the electronic invitation and PN credential being created remotely by a server associated with the network for a physical structural environment (PSE) corresponding to a location of the scheduled event.

Additionally or alternatively, in accordance with aspects herein, the method further comprises, prior to the storing, comparing the PN credential to one or more of a calendar invitation, electronic mail, text message, current location of the ED and current date, and based on the comparing determine whether to import the PN credential to the ED. Additionally or alternatively, in accordance with aspects herein, wherein the ED represents a first ED, the method further comprising granting access to the PN credential to one or more secondary EDs that have access to one or more of a common calendar, electronic mail or text messaging account associated with the first ED. Additionally or alternatively, in accordance with aspects herein, the method further comprises, at a first point in time, receiving the PN credential when the ED is outside a range of the network; at a later second point in time, determining that the ED is within a range of the network; and utilizing the PN credentials to access the network automatically in response to determining that the ED is within the range of the network.

In accordance with embodiments herein, a device is provided that comprises a user interface; a processor; a memory storing program instructions accessible by the processor, wherein, responsive to execution of the program instructions, the processor to perform the following: receive, at an electronic device (ED), pre-authorization network (PN) credentials for access to a wireless network in connection with a scheduled event; and store the PN credentials in association with the scheduled event, the PN credentials to be utilized to access the network.

Additionally or alternatively, in accordance with aspects herein, responsive to execution of the program instructions, the processor stores the PE credentials, on the ED, with one or more of location and date information related to the scheduled event. Additionally or alternatively, in accordance with aspects herein, responsive to execution of the program instructions, the processor receives an electronic invitation in connection with the scheduled event, the electronic invitation including the PN credentials and one or more of a location and time associated with the scheduled event. Additionally or alternatively, in accordance with aspects herein, responsive to execution of the program instructions, the processor imports the PN credentials onto a prestored list of credentials associated with different networks, the PN credential including sign and authorization information for the ED and an identifier of the network.

Additionally or alternatively, in accordance with aspects herein, responsive to execution of the program instructions, the processor determines one or more of: i) detect a SSID for the network, ii) utilize GPS data to identify when the ED is at a location associated with the scheduled event, iii) determine that a current time corresponds to a time of the scheduled event, and iv) determines that a current location of the ED corresponds to a location of the scheduled event. Additionally or alternatively, in accordance with aspects herein, responsive to execution of the program instructions, the processor generates a request associated with the scheduled event and receives an electronic invitation, including the PN credential, in response to the request, the electronic invitation and PN credential being created remotely by a server associated with the network for a physical structural environment (PSE) corresponding to a location of the scheduled event.

In accordance with embodiments herein, a computer program product is provided comprising a non-signal computer readable storage medium comprising computer executable code to perform: receiving, at an electronic device (ED), pre-authorization network (PN) credentials for access to a wireless network in connection with a scheduled event; and storing the PN credentials in association with the scheduled event, the PN credentials to be utilized to access the network.

Additionally or alternatively, in accordance with aspects herein, further comprising computer executable code to perform: storing the PE credentials, on the ED, with one or more of location and date information related to the scheduled event. Additionally or alternatively, in accordance with aspects herein, further comprising computer executable code to perform: receiving an electronic invitation in connection with the scheduled event, the electronic invitation including the PN credentials and one or more of a location and time associated with the scheduled event. Additionally or alternatively, in accordance with aspects herein, further comprising computer executable code to perform: importing the PN credentials onto a prestored list of credentials associated with different networks, the PN credential including sign and authorization information for the ED and an identifier of the network.

In accordance with embodiments herein, a system is provided that comprises a user interface; a processor; a memory storing program instructions accessible by the processor, wherein, responsive to execution of the program instructions, the processor to perform the following: convey the credentials to the ED; and grant access to the PSE network.

Additionally or alternatively, in accordance with aspects herein, responsive to execution of the program instructions, the processor performs one or more of: i) identifying a new reservation from an ED, ii) determining whether the new reservation includes sending automatic PN credentials for the PSE network to the ED, and iii) determining whether an old credential is in memory, wherein, the old credential is deleted upon detection.

In accordance with embodiments herein a method is provided that comprises identifying, at a server associated with a PSE network, from an ED a new request associated with a scheduled event; determining whether the new request includes automatically sending a PN credential for the PSE network to the ED; conveying the PN credential to the ED when the ED is outside of a range of the PSE network and prior to the scheduled event; determining that the ED is within the range of the PSE network; and granting the ED access to the PSE network based on the PN credential.

Additionally or alternatively, in accordance with aspects herein, responsive to execution of the program instructions, the processor receives credentials in connection with an invitation confirmation. Additionally or alternatively, in accordance with aspects herein, responsive to execution of the program instructions, the processor determines whether the credentials are valid. Additionally or alternatively, in accordance with aspects herein, responsive to execution of the program instructions, the processor determines whether credentials are expired. Additionally or alternatively, in accordance with aspects herein, responsive to execution of the program instructions, the processor determines whether credentials match current booking information. Additionally or alternatively, in accordance with aspects herein, responsive to execution of the program instructions, the processor determines whether credentials are associated with a VIP. Additionally or alternatively, in accordance with aspects herein, responsive to execution of the program instructions, the processor identifies a new reservation from an ED.

Additionally or alternatively, in accordance with aspects herein, responsive to execution of the program instructions, the processor denies access to the PSE network upon determination of invalid credentials; denies access to the PSE network upon determination of expired credentials; denies access to the PSE network upon determination of mismatched credentials and the current booking information; and grants access to the PSE network upon determination of a credential associated with a VIP, despite one or more of the invalid credentials, expired credentials, and mismatched credentials. Additionally or alternatively, in accordance with aspects herein, responsive to execution of the program instructions, the processor records position data of the ED in a tracking log and includes a check-in time, a check-out time, access level, and a PSE room number.

In accordance with embodiments herein, a computer program product is provided comprising a non-signal computer readable storage medium comprising computer executable code to perform: identifying a new reservation from an ED; determining whether the new reservation includes sending automatic credentials for the PSE network to the ED; conveying the credentials to the ED; determining whether an old credential is in memory, wherein the old credential is deleted upon detection; and granting access to the PSE network.

Additionally or alternatively, in accordance with aspects herein, further comprising: receiving credentials in connection with an invitation confirmation; determining whether the credentials are valid; determining whether credentials are expired; determining whether credentials match current booking information; determining whether credentials are associated with a VIP. Additionally or alternatively, in accordance with aspects herein, further comprising: denying access to the PSE network upon determination of invalid credentials; denying access to the PSE network upon determination of expired credentials; denying access to the PSE network upon determination of mismatched credentials and the current booking information; and granting access to the PSE network upon determination of a credential associated with a VIP, despite one or more of the invalid credentials, expired credentials, and mismatched credentials.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "physical structure environment" and PSE shall mean an internal region of one or more buildings and/or an external region proximate to and surrounding one or more buildings. The PSE shall represent the structure having a wireless network for guest access.

The term "ED" shall mean an electronic device that is carried by an individual while navigating within a PSE and using the wireless network provided within the PSE.

For example, at one point in time, when an individual carries an ED into a PSE, the ED is automatically connected to the wireless network of the PSE based on a previous invite via a calendar invite, email, text, and the like.

The term "scheduled event" shall mean an activity defined by dates, times, locations, and the like, for which a preauthorization network (PN) credential will be generated. Nonlimiting examples of scheduled events may include an office meeting, hotel check-in/check-out, or a layover at an airport. For example, an invite for a meeting scheduled for Wednesday at noon may be sent as a calendar invite using an email program such as Microsoft Outlook. The invite may include a PN credential generated by a server associated with the PSE wherein the meeting takes place, the PN credential to be generated and received by the ED prior to the scheduled event.

The term "network credential" shall mean information stored in a file that provides a user access to a PSE network. Nonlimiting examples of a network credential includes but is not limited to a sign-in, a password, and an SSID for a PSE network. For example, a user may schedule a doctor's appointment and request access to the office Wi-Fi to complete an assignment while waiting in the lobby. The request may be confirmed with a click on a confirmation screen that downloads a small file on the user's ED. The small file may contain the user's temporary sign-in and password for access to the office Wi-Fi identified by SSID.

The term "electronic invitation "shall mean an electronic communication conveyed to an ED, where the electronic invitation includes scheduling information associated with a scheduled event. Nonlimiting examples of electronic invitations include calendar invitations, invitations conveyed by email, text message and/or through a travel related application. For example, a travel related application may include an application associated with a travel agent, an airline, a hotel chain, a convention center, an individual company, an organization, and educational entity and the like. Nonlimiting examples of scheduling information include locations, dates and times associated with a scheduled event, an itemized calendar of meetings or other scheduled items associated with the scheduled event. For example, when a scheduled event corresponds to a flight, the electronic invitation may include one or more of a flight time, gate, aircraft information, as well as pre-authorized network credentials for the Wi-Fi within an airport, airline club, individual aircraft and the like. As another example, when the scheduled event corresponds to a hotel or other travel destination reservation, the electronic invitation may include check-in dates, check-out dates, room numbers, and the like. As another example, when the scheduled event corresponds to an event held at a convention center, the electronic invite may include dates, times, locations, and the like. As another example, when the schedule event corresponds to a meeting, within a company, where the meeting is located in another building that an individual does not normally occupy, the electronic invitation may include address, dates, office numbers, building, numbers, and the like.

In accordance with new and unique aspects herein, the preauthorization network (PN) credentials for a network associated with the scheduled event may also be included within the electronic invitation, and/or conveyed separately from the electronic invitation.

In accordance with embodiments herein, methods, systems, and computer program products are provided that enhance ED connection to the wireless network of a PSE. For example, an individual may schedule a trip and book a room at a hotel. The hotel may send a confirming calendar invite containing not only the dates for the traveler's visit, but also the wireless network connection information. Confirmation of the invite on the ED may then catalog the ED information, such that the ED is recognized upon check-in. The traveler may be tracked via Wi-Fi nodes within the PSE that recognize the EDs presence and grant wireless network access based on the previous confirmation via the calendar invite.

Figure 1:
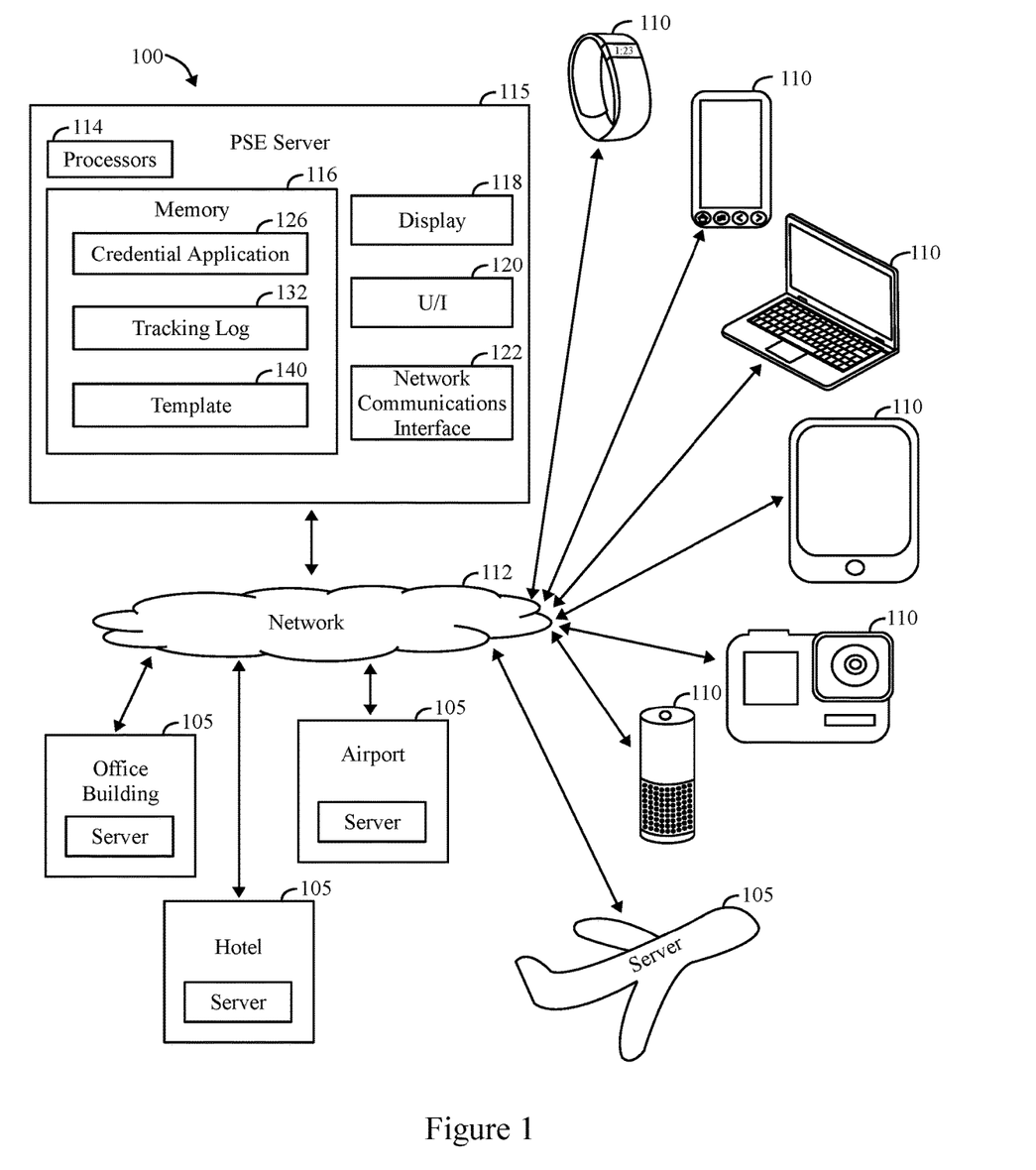
FIG. 1 illustrates a system that distributes wireless credential information to electronic devices in accordance with embodiments herein.

FIG. 1 illustrates a system that distributes wireless credential information to electronic devices in accordance with embodiments herein. The system 100 includes one or more electronic devices 110 that communicate with one another over a network 112 associated with a PSE 105. The network 112 may represent the World Wide Web, a local area network, a wide area network and the like. The EDs 110 may represent various types of EDs including, but not limited to, smart phones, desktop or laptop computers, tablet devices, smart watches, portable or handheld cameras, recording devices, digital personal assistant (DPA) devices and the like.

A PSE server 115 may be configured to provide credentials to EDs 110 for connecting to the network 112 in accordance with embodiments herein. The PSE server 115 that is configured to provide credentials may include one or more processors 114, memory 116, a display 118, a user interface 120, a network communications interface 122, and various other mechanical components, electrical circuits, hardware and software to support operation of the client ED 110.

The PSE server 115 may include one or more user interfaces 120. The user interface 120 may include a variety of mechanical devices. For example, the user interface 120 can include mechanical input devices such as a keyboard, keypad, selection hard and/or soft buttons, switch, touchpad, touch screen, icons on a touch screen, touch sensitive areas on a touch sensitive screen and/or any combination thereof. Similarly, the user interface 120 can include a visual output device such as a liquid crystal display screen, one or more light emitting diode indicators, and an audio output device such as a speaker. The display may be touch sensitive to various types of touch and gestures. As further examples, the user interface 120 may include a touch sensitive screen, a non-touch sensitive screen, a text-only display, a smart phone display, an audio output (e.g., a speaker or headphone jack), and/or any combination thereof. The user interface 120 permits the user to select one or more of a switch, button or icon in connection with various operations of the PSE server 115.

The network communications interface 122 provides a direct connection to other devices, auxiliary components, or accessories for additional or enhanced functionality, and in particular, can include a USB port for linking to a user device with a USB cable. Optionally, the network communications interface 122 may include one or more transceivers that utilize a known wireless technology for communication.

The memory 116 can encompass one or more memory devices of any of a variety of forms (e.g., read only memory, random access memory, static random-access memory, dynamic random-access memory, etc.) and can be used by the processor 114 to store and retrieve data. The data that is stored by the memory 116 can include, but need not be limited to, operating systems, applications, and other information. Each operating system includes executable code that controls basic functions of the communication device, such as interaction among the various components, communication with external devices via a wireless transceivers and/or component interface, and storage and retrieval of applications and data to and from the memory 116. Each application includes executable code that utilizes an operating system to provide more specific functionality for the communication devices, such as file system service and handling of protected and unprotected data stored in the memory 116.

The memory 116 further includes, among other things, a credential application 126 and a tracking log 132. The functionality of the credential application 126 is described below in more detail. The template 140 may include one or more types of templates that are descriptive of, and associated with, PSE locations. The template may track an ED location to determine whether the ED is within a PSE boundary to receive credentials for the PSE network 112. For example, the template may identify a particular location associated with an ED tracked via a Wi-Fi node in a particular location, such as the lobby of the PSE, to be a location sufficient for providing credentials for access to the PSE network 112. However, the ED may not be granted credentials for the PSE network 112 outside in the parking lot.

The credential application 126 generates ED connection privileges through the PSE network 112 and stores PSE network connection information. The PSE network connection information may represent Wi-Fi. The credential application 126 is configured to track position data and provide network access for the EDs 110 while the EDs 110 navigate through the PSE.

As explained herein, the credential application 126 utilizes the template 140 to analyze the ED locations for providing PSE network access based on calendar invites, text messages, and the like. The credential application 126 updates the tracking log 132 based on the analysis and provides feedback to the user concerning network connection privileges within a PSE. The tracking log 132 maintains information concerning ED connection privileges. By way of example, the tracking log 132 may include information concerning ED check-in/check-out dates, PSE network access levels, and PSE room numbers. The check-in/check-out dates for an ED may be stored into the tracking log based on a user obtaining room keys, a triangulated location from Wi-Fi nodes, and the like. The access level may be stored as levels of broadband service available to the ED 110. Room numbers may be stored as the number of the room in which the user has checked into.

In the foregoing example, the PSE server 115 implements the credential application 126, providing an electronic invitation to an authorized ED user for a scheduled event. The electronic invitation may contain a calendar invite, text invite, email invite, and the like that contains PN credentials for connecting to the PSE network 112 corresponding to check-in/check-out dates, ED location, and the like.

Additionally or alternatively, all or portions of the credential application 126 may be implemented remotely on a remote resource. The PSE server 115 may perform limited operations, such as manage storage and creation of templates. The PSE server 115 may communicate with EDs 110 through one or more networks 112 to provide access to the template 140. The PSE server 115 may represent a server or other network-based computing environment. The PSE server 115 may represent a single computer system or a collection of computer systems located at a common location or geographically distributed.

The PSE server 115 includes one or more processors 114 and memory 116, among other structures that support operation of the PSE server 115. In accordance with embodiments herein, the PSE server 115 receives confirmations from various EDs 110 and returns network connection credentials in connection therewith. It is recognized that the PSE server 115 may perform other operations, not described herein, such as operations associated with maintaining resources and the like.

Figure 2:
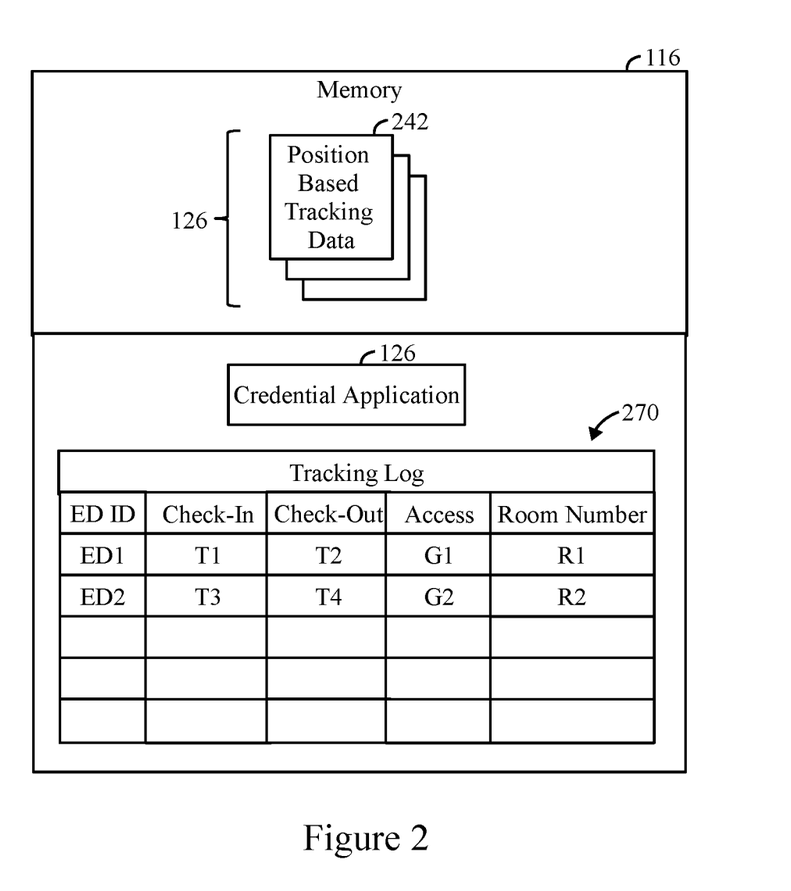
FIG. 2 illustrates a block diagram of the modules, catalogues, data and other information that may be stored within the memory in accordance with embodiments herein.

FIG. 2 illustrates a block diagram of the modules, catalogues, data and other information that may be stored within the memory 116 in accordance with embodiments herein. The credential application 126 includes program instructions accessible by the one or more processors to direct a processor to implement the methods, processes and operations described herein including, but not limited to the methods, processes and operations illustrated in the Figures and described in connection with the Figures. The credential application 126 includes one or more modules that operate in connection the various functions and features as described herein.

The memory 116 stores position-based tracking data 242 for an ED 110. The position-based tracking data may include the signal strength of the Wi-Fi connection to the EDs 110 moving throughout the PSE. Wi-Fi nodes may be located in one or more locations throughout the PSE 105. The position-based tracking data may also provide information for determining a wireless network range for a connection to an ED 110. For example, the position-based tracking data may provide an inclusionary boundary that is within a range deemed acceptable by the one or more processors 114. For example, an ED 110 may remain connected to the PSE network 112 within the boundary. In contrast, the area outside the boundary may be deemed unacceptable by the one or more processors 114. The connection to the PSE network 112 may be terminated while the ED 110 is outside of the boundary.

The memory 116 may also store a tracking log 270 that is maintained and updated in connection with EDs 110 presently connected to the PSE network 112. For example, the tracking data may be analyzed to identify network connection information, and the information is stored in the tracking log.

In one embodiment, with reference to FIG. 2 the tracking log 270 records ED1 starting at check-in date T1 with a check-out date of T2. The check-in and check-out dates may relate to specific dates expressed in a previous electronic invitation. For example, T1 may represent Thursday at 5 pm and T2 may represent Saturday at 10 am. The access level may relate to a level of service provided by the PSE 105 according to the needs of the user of the ED 110. For example, the G1 access level may be a free, basic level of wireless access to the PSE network 112 corresponding to a 10 MB/s download speed. The room number may relate to the number of the room registered to the user of the ED 110 for during of time the user is a guest of the PSE 105. For example, a user of an ED 110 may be assigned room R1 during the duration of a stay (T1 through T2) in the PSE 105. Another example may include a user with an ED 110, ED2. The user may register and plan on checking in at time T3 and checking out at time T4. The user may intend to perform work requiring a faster connection speed than the basic G1 service and instead choose an upgrade to access level G2. Access level G2 may provide a 50 MB/s download speed that is sufficient for the user. Although this PSE 105 example relates to a hotel, it is understood that the PSE 105 may be various buildings or structures with guest access to an associated PSE network 112.

Figure 3A:
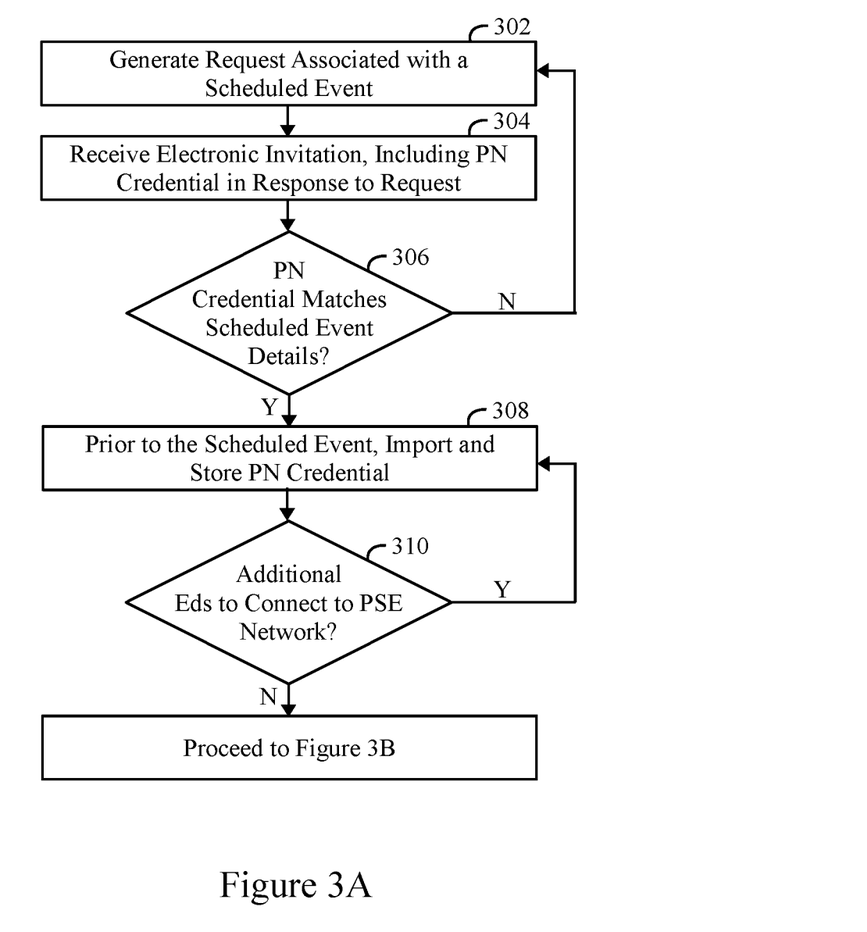
FIG. 3A illustrates a process for an electronic device receiving wireless credentials in accordance with embodiments herein.

FIG. 3A illustrates a process 300 for receiving a PN credential for connecting to a PSE network, where the PN credential is received prior to arriving at the PSE. The operations of FIG. 3A may be performed in association with an electronic device with booking a trip through a web site or application. For example, a traveler may access the web site of a hotel. The traveler may decide to book a flight and a hotel stay in association with a business meeting. The traveler may receive a PN credential for automatically connecting to the wireless network of the hotel. The electronic device of the traveler may import and install the PN credential. Upon arrival at the hotel, the electronic device of the traveler may automatically connect to the wireless network of the hotel. Additionally or alternatively, the traveler may receive PN credentials for multiple electronic devices.

At 302, the ED generates a request associated with a scheduled event. For example, the scheduled event may be a forthcoming flight. A user of an ED may use an application from the associated airline book the flight. Additionally, the user may select an option that provides a wireless connection to a PSE network on the airplane. Upon clicking a submit button, the registration made by the user may serve as a request made by the ED. Optionally, the method may include the ED generating a request associated with the scheduled event, and receiving an electronic invitation, including the PN credential, in response to the request, the electronic invitation and PN credential being created remotely by a server associated with the network for a physical structural environment (PSE) corresponding to a location of the scheduled event.

As an example, in FIG. 1, the PSE in the foregoing example may be an airplane with a PSE server associated with the request. The user of an ED may decide to book a flight using the website of an airline company. The ED may be a notebook computer 110 that the user utilizes to reserve the flight. The user of an ED may plan to work at the airport and during the flight, submitting the work to a client before landing. The notebook computer may access the website of the airline. The website may display flight options that allow wireless internet access in the airport and onboard the airplane. The traveler may choose the option for internet access in the airport and onboard the airplane. Upon the traveler confirming the details regarding the trip, the confirmation serves as a request from the traveler to have a PN credential sent to the notebook computer in association with the trip. Optionally, the PN credential may be generated remotely by the PSE server in response to the request from the ED.

At 304, the method includes receiving, at an electronic device (ED), pre-authorization network (PN) credentials for access to a wireless network in connection with a scheduled event, the ED receiving the PN credentials when the ED is outside a range of the network. For example, the ED may receive a confirmation of the forthcoming flight reservation. The confirmation serves as an electronic invitation to establish a connect to the PSE network on the airplane. The confirmation may also include a PN credential corresponding to the PSE network access. Optionally, the method may include receiving an electronic invitation in connection with the scheduled event, the electronic invitation including the PN credentials and one or more of a location and time associated with the scheduled event.

Figure 5:
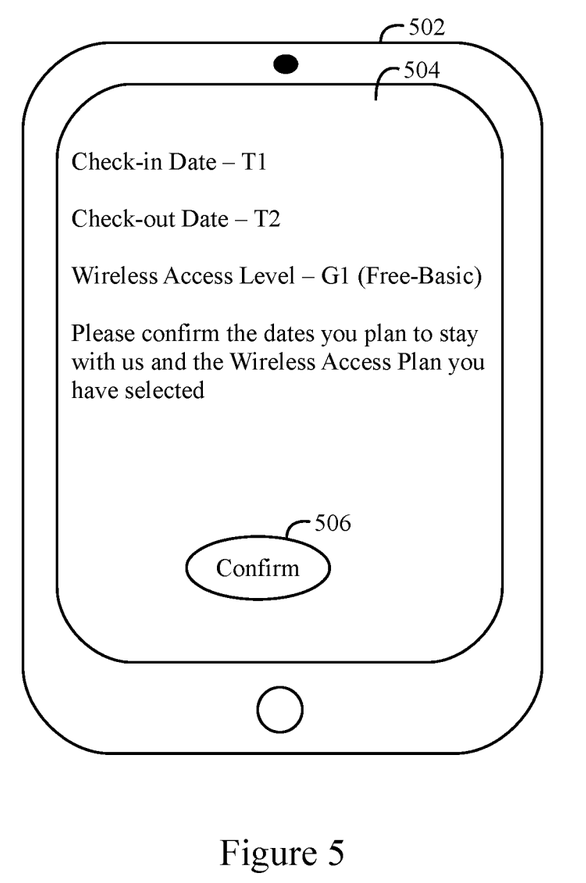
FIG. 5 illustrates a confirmation screen of an ED for connecting to a wireless network in accordance with embodiments herein.

As an example, in FIG. 5 the ED 500 shows a confirmation screen. The screen provides a screen with the choices made by the traveler in association with the upcoming flight. This confirmation screen serves as an electronic invitation for the ED 500 to gain access to the PSE network on the airplane. The user may use an application on a mobile phone to confirm the upcoming flight with PSE network access. Clicking the confirm button includes creating a PN credential in response to the reservation request. A link to the PN credential may be on a webpage that pops up after the confirmation button is pressed. The traveler may have to click the PN credential link to commence receiving the PN credential on the notebook. The PN credential may include the SSID of the wireless network of the airplane as well as login and password information for the notebook computer. Optionally, a text, or email containing a link to or an attachment containing the PN credential may be generated and sent to the traveler in response to the confirm button being clicked by the traveler. Optionally, the text or email electronic invitation may include the PN credentials and details regarding the location and time associated with the scheduled event.

At 306, a determination is made as to whether the PN credential matches the details of the scheduled event. For example, the scheduled event may be a meeting scheduled in association with a calendar invite. The calendar invite may include the date, time, location, and duration of the meeting along with a PN credential for access to the PSE network. The one or more processors may analyze the dates of the calendar invite and the meeting to determine if the dates, times, and location correlate prior to storing the PN credential. For example, an ED confirmation of a meeting on Tuesday at 3 pm at a client's office via a text message may not receive a PN credential if the analysis detects a cancellation of the meeting via a subsequent text, email, or the like. A notification screen may pop up on the display of the traveler's ED that alerts the traveler to the issue. The notification may include an option that allows the traveler to edit the details of or cancel the scheduled request. Otherwise, the process proceeds to step 308 if the PN credential and scheduled meeting details match. Optionally, the method may include, prior to the storing, comparing the PN credential to one or more of a calendar invitation, electronic mail, text message, current location of the ED and current date, and based on the comparing determine whether to import the PN credential to the ED.

At 308, the method provides, prior to the scheduled event, storing the PN credentials in association with the scheduled event. For example, after analysis and confirmation the PN may be imported and stored into the ED. Utilizing an application, a cookie from a web site, and the like, a file may be placed in a directory, a digital wallet, or the like where the file may be retrieved at a later date for access to the PSE network. The PN credential file on the ED may create a new network in the setup of the ED. Optionally, the method may include storing the PE credentials, on the ED, with one or more of location and date information related to the scheduled event. Optionally, the method may include importing the PN credentials onto a prestored list of credentials associated with different networks, the PN credential including sign and authorization information for the ED and an identifier of the network.

As an example, the scheduled event may be a conference. A traveler planning to attend a conference may click a PN credential link presented via text, email, calendar invite, and the like after confirming of the conference trip details, such as the location and date information related to the scheduled event. The traveler may be presented a warning about downloading malicious files from the internet. The traveler may then be presented an option to save the file or run the file. The text, email, calendar invite, or the like may instruct the traveler to run the file. Running the file may commence a setup routine that places applicable files where necessary and creates new files, settings, and the like. For example, the setup routine may create new settings associated with the wireless network associated with the conference. The settings may include adding a new Wi-Fi network corresponding to the SSID of the wireless network that will be available at the conference, "conf2_5G." The settings may also include the login and password assigned to the traveler for access to the wireless network. The credentials for new Wi-Fi network "conf2_5G" may be imported onto a prestored list of credentials associated with different networks stored in the ED.

At 310, the one or more processors may determine if the user has additional EDs that may require access to the PSE network. For example, a screen may present a query to the user regarding additional EDs needing access to a PSE network. An affirmative response from the user may result in PN credentials being shared and imported into the additional EDs. Optionally, the method may include granting access to the PN credential to one or more secondary EDs that have access to one or more of a common calendar, electronic mail or text messaging account associated with the first ED. For example, multiple EDs belonging to a user may have email confirmation of a meeting along with a PN credential. Each ED requiring access may be required to separately confirm for the PN credential to be downloaded. If there are no further EDs requiring access to the PSE network to process proceeds to 312.

As an example, a traveler planning to attend the conference in the foregoing example may need to connect multiple devices while attending the conference. The traveler may receive a notification from the website about connecting additional EDs during the conference. The website may inquire about the types of EDs the traveler wishes to connect to the wireless network available during the conference. Based on the responses given by the traveler, the one or more processors may send additional texts, emails, calendar invites, and the like to the additional EDs. Optionally, the additional EDs may have shared texts, email accounts, calendar applications, and the like with the first ED, and may not require additional notifications. Clicking the link provided in the text, email, calendar invite, and the like may perform the operation of setting up the traveler's additional devices with the PN credentials for each device.

Figure 3B:
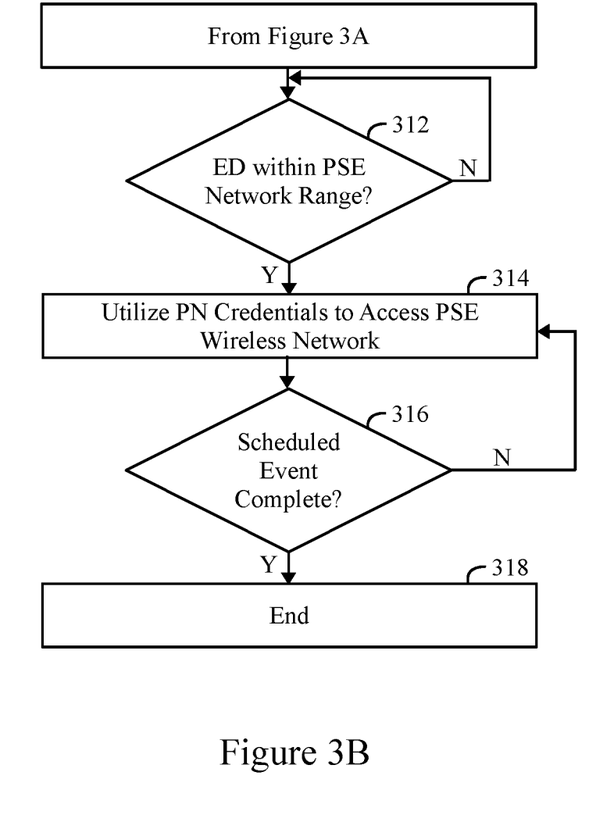
FIG. 3B illustrates a process for an electronic device receiving wireless credentials in accordance with embodiments herein.

FIG. 3B illustrates the process 300 of receiving a PN credential by determining that the ED is within a range of the network, where the electronic device of the traveler may use the installed PN credential to automatically connect to the wireless network of the PSE. Upon completion of the scheduled event, the process may end access to the PSE network.

At 312, the one or more processors determine if the ED is within the range of the PSE Network. For example, the ED may detect the PSE network created by the PN credential, based on the SSID of the PSE network. An indication may appear on a screen of the ED to notify the user that a network has been detected. If the one or more processors of the ED travel within a boundary corresponding to the range of the wireless network, the PSE network is detected. Optionally, determining if the ED is within the range of the PSE Network may include one or more of: i) detecting a SSID for the network, ii) utilizing GPS data to identify when the ED is at a location associated with the scheduled event, iii) determining that a current time corresponds to a time of the scheduled event, and iv) determining that a current location of the ED corresponds to a location of the scheduled event.

As an example, the ED may be a smart watch with the PN credential installed. The traveler may enter the convention center parking lot. The ED may detect the presence of the wireless network of the convention center. The traveler may not be aware of the detection unless the traveler enters the Wi-Fi setup and sees the convention center SSID among others. Optionally, a notice may appear on the smart watch screen that detects a Wi-Fi network connection. The Wi-Fi network connection may be the SSID "conf2_5G" of the convention center. The traveler may also have other EDs such as mobile phones, tablet computers, notebook computers, and the like. Upon waking up the EDs from sleep mode, the traveler may receive a notice on each ED that each ED has detected the wireless network, "conf2_5G." Optionally, the ED may utilize GPS location services to determine proximity to the scheduled event to determine if the ED is within the range of the PSE network. Optionally, the ED may correlate the actual time with the time of the scheduled event to determine if the ED is within the range of the PSE network. Optionally, the ED may correlate current location information with the location of the scheduled event to determine if the ED is within the range of the PSE network.

At 314, the method includes utilizing the PN credentials to access the network. For example, the PN credential may contain the SSID, login, and password information required for an ED to automatically connect to the PSE network. Alternatively, the ED may be allowed PSE network access to an ED only after check-in.

As an example, the ED may be a mobile phone. The traveler may notice a Wi-Fi connection symbol on the mobile phone. The traveler may proceed from the parking lot into the convention center. Additionally, the traveler may have a display booth at the convention center set up with other EDs such as smart watches, tablet computers, notebook computers, and the like. Upon turning on the EDs or waking up the EDs from sleep mode, the traveler may receive a notice that each ED has a connection to the wireless network, "conf2_5G." The connection to the convention's wireless network, "conf2_5G," may be the result of the PN credential Optionally, the EDs may automatically connect to "conf2_5G" without providing a notification.

At 316, the one or more processors determine whether the scheduled event is complete. For example, a scheduled event may be determined complete upon check-out. The check-out date may correspond to the date in the PN credential. Alternatively, as another example, the check-out date may not correspond to the check-out date as in the original PN credential. The PN credential may be adjusted to allow for a shorter or longer network access window as needed.

As an example, the scheduled event may be a birthday party at a banquet hall. The event may occur on a Saturday night from 7 pm until 10 pm. The travelers may have instructions to take pictures videos of the occasion and upload during the party to a remote server. The PN credentials correspond to the date, time, location, and duration of the party to allow guests to use the banquet hall Wi-Fi to upload the pictures and videos. The PN credential may also be distributed to the DJ of the party to allow internet access to the streaming music collection to be played during the party. The wireless access for the DJ may accommodate set up time. Optionally, the duration of the wireless access for the EDs of the party attendees may be extended past the originally scheduled end time to accommodate the needs of the occasion and allow continued access to the wireless network.

At 318, the one or more processors end the process. For example, if the ED user is within the boundary of the PSE network with PN credentials during the correct time span and checks out at the dates of the scheduled event check out date, the process ends.

As an example, the attendees of the foregoing example may lose access to the wireless network of the banquet hall at the designated end time of the scheduled event. As noted above, the scheduled event is a party scheduled for three hours on a Saturday ending at 10 pm. If there are no extensions of the time scheduled for the occasion, the process may end at 10 pm. The DJ and other attendees may lose access to the wireless network of the banquet hall.

Figure 4A:
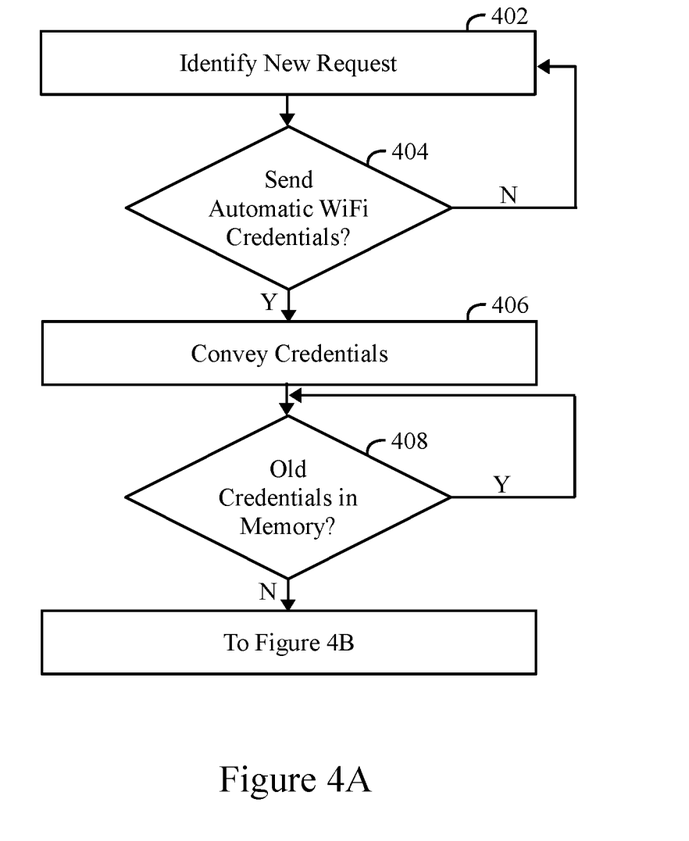
FIG. 4A illustrates a process for distributing wireless credentials to electronic devices, in accordance with embodiments herein.

FIG. 4A illustrates a process 400 for providing a PN credential for connecting to a PSE network, where the PN credential is received prior to arriving at the PSE. The operations of FIG. 4A may be performed in association with an electronic device with booking a trip through a web site or application. For example, a traveler may access the web site of a hotel. The PSE server may be located at the hotel. The one or more processors in a PSE server determine whether the PN credential should be automatically sent to the traveler's ED. The PSE server may provide a PN credential to the traveler so the ED of the traveler may automatically connect to the wireless network of the hotel. Additionally or alternatively, the server may provide PN credentials for multiple electronic devices.

At 402, the method may include identifying, at a server associated with a PSE network, from an ED a new request associated with a scheduled event. For example, the request may result from an ED using an application with a travel agent to book a vacation. The PSE server may be at a travel agency office or in an airport. The submitting of an initial travel inquiry by the ED may generate a new request.

As an example, the scheduled event may be a vacation to Hawaii. A traveler may use an application on an ED. The ED may be a tablet computer such as an Apple iPad, Microsoft Surface, Google Nexus, and the like. The application may be from a travel agency. The travel agency may have a network server on the premises for providing the travel application. The traveler may be browsing various travel scenarios using the travel application. The traveler may decide to book a two-week Maui Resort vacation beginning on the first Saturday in January and ending two weeks later with wireless interne access available in the airport, during the flight, and at the Maui Resort. The booking by the traveler may serve as a new request for the server at the travel agency.

At 404, the method may include determining whether the new request includes automatically sending a PN credential for the PSE network to the ED. For example, an ED may have credentials and scheduled events that match as well as a user that consents to having a file placed in storage for the purpose of an automatic connection to a PSE network. The PSE server may send the PN credential to the ED. However, as in another example, the user may not consent to a file being placed on the user's ED. The PSE server may not send the PN credential to the ED. In another example, a user may try to register for a meeting that has been canceled. The PSE server at the meeting place may not distribute any PN credentials associated with the meeting for guest PSE network access.

As an example, the travel agency server in the foregoing example determines whether or not to automatically send a PN credential to the ED of the traveler heading to a Maui Resort for vacation. The server may evaluate the features selected by the traveler during the booking operation. The features selected by the traveler may include a desire for automatically connecting to the wireless networks in the airport, airplane, and resort. The server may obtain travel times and coordinate with servers on other networks to ensure that the traveler has the correct wireless access in the right places at the right times. The first PSE server at the travel agency may need to communicate with a second PSE server at the airport, a third PSE server onboard the airplane, and a fourth PSE server at the Maui Resort. The server may determine that based on the information from the traveler, a PN credential should be automatically be sent to the traveler. In other embodiments, another traveler may opt out of such activities. The server may determine that a PN credential will not be sent automatically to the ED of the traveler that opted out of the service.

At 406, the method may include conveying the PN credential to the ED when the ED is outside of a range of the PSE network prior to the scheduled event. For example, upon confirmation of a scheduled event and consent from a user, the PN credential may be distributed via a text message from the PSE server. The PN credential may then be stored in a file in the ED.

As an example, the first PSE server at the travel agency from the foregoing example may convey the PN credential to the traveler for the vacation to the Maui Resort. The server at the travel agency may display a confirmation screen on the traveler's ED that gives the dates, times, locations, and duration of the Maui Resort vacation. The first PSE server may have gathered all PN credentials from the second, third, and fourth PSE servers and consolidated the information into a single PN credential. The first PSE server may send a notification to the traveler in the form of a text, email, calendar invite, and the like. The notification in the text, email, calendar invite, and the like, may include instructions for downloading and installing the PN credential file and a link to the file. The instructions from the first PSE server may provide step-by-step instructions, such as directing the traveler to click the file to download, choose ok to run the file, and the like.

At 408, the one or more processors determine whether the PSE server contains old credentials in memory. For example, the PSE server may contain old credentials that were previously distributed to EDs for scheduled events that have occurred. The one or more processors may determine that the credentials are still in memory and not necessary for any current operations. The one or more processors may then delete the old credentials from the PSE server. If there are no old credentials detected, the process moves to 410.

As an example, a PSE server at a PSE in Las Vegas may contain old PN credentials. The scheduled event may be a night on the town in Las Vegas with gambling as the main event. The PSE may be The Bellagio Hotel and Casino, a popular venue with wireless interne access available to guests. The PSE server in the Bellagio may have several guests that have recently checked out. The PN credentials for the guests may now be old credentials. The one or more processors in the PSE server may analyze the scheduled events and determine that 1,250 PN credentials are in memory and some of the travelers associated with the PN credentials checked out within the past 24 hours. The threshold for determining whether a PN credential is old may be 24 hours. Optionally, the one or more processors in the PSE server may check more frequently, such as every 12 hours. Optionally, the one or more processors in the PSE server may check less frequently, such as every 48 hours or weekly. If the one or more processors in the PSE determine that the PN credentials that remain in memory are old, the one or more processors may direct the server to delete the PN credentials.

Figure 4B:
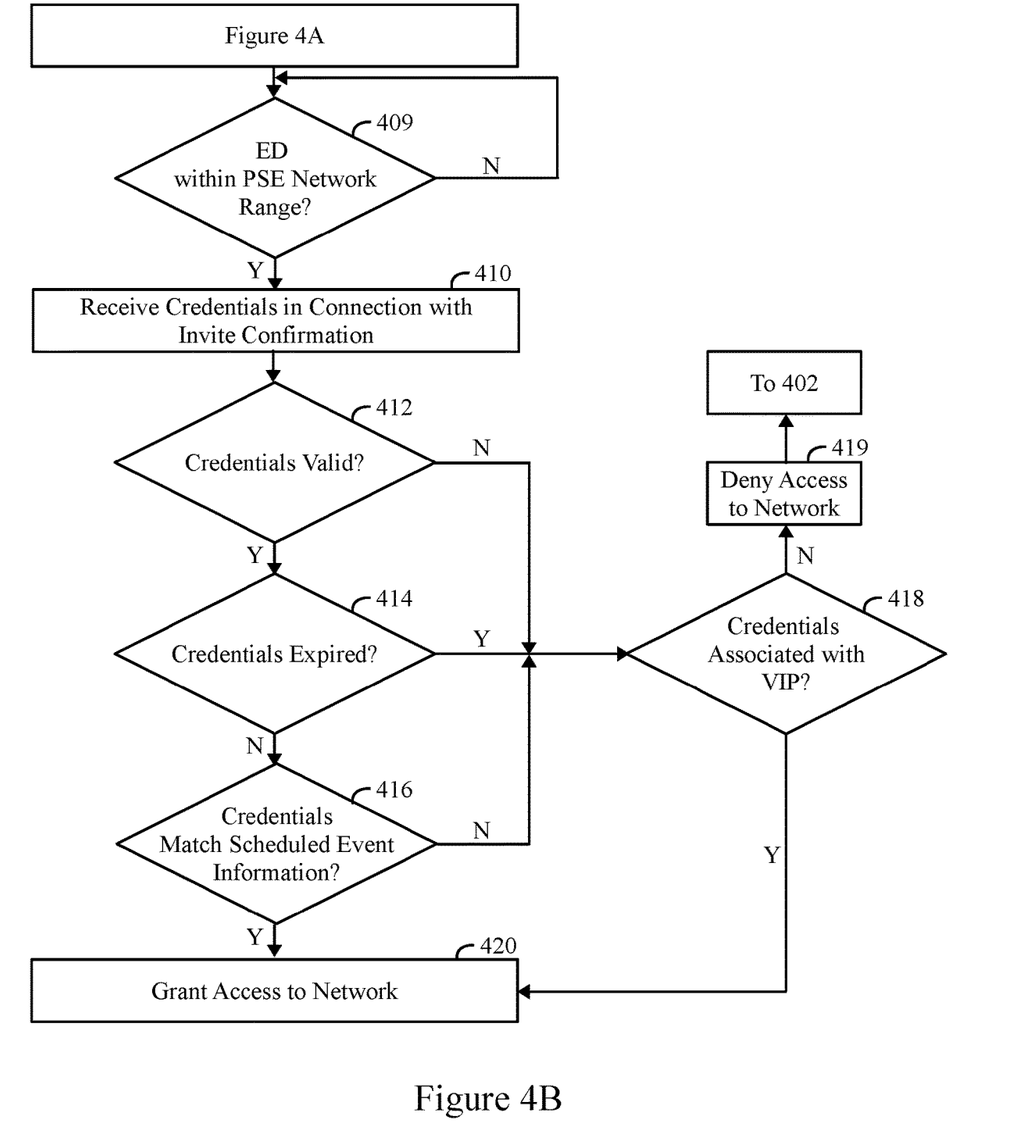
FIG. 4B illustrates a process for distributing wireless credentials to electronic devices, in accordance with embodiments herein.

FIG. 4B illustrates a process 400 for providing a PN credential for connecting to a PSE network, where the PN credential is received prior to arriving at the PSE. The operations of FIG. 4B may be performed in association with an electronic device with booking a trip through a web site or application. For example, upon arrival at the hotel, the ED of the traveler may automatically connect to the wireless network of the hotel after the one or more processors in a PSE server determine whether the PN credential is expired, valid, and/or matches the details of the scheduled event. However, if a VIP is associated with the PN credential, the foregoing issues and/or concerns may be overlooked, and access may be granted. Additionally or alternatively, the server may provide PN credentials for multiple electronic devices.

At 409, the method may include determining that the ED is within the range of the PSE network. For example, the one or more processors in the PSE server may contain a list of connected devices. The ED connection status may change from inactive to active in a log maintained within the server.

As an example, the ED may be a mobile phone. The scheduled event may be a sporting event with internet access for paying attendees. The PSE may be an arena. A traveler may enter the arena with the mobile phone. The mobile phone may have Wi-Fi services enabled. The arena network server may contain a log with the ED and associated PN credentials. The arena network server may determine that the ED is within the range of the wireless network based on the ED location, time, date, and the like in association with the scheduled event.

At 410, the server receives credentials in connection with an invite confirmation. For example, after the PSE server determines that an ED is within range of the PSE network. The PSE server may detect the PN credential stored in the ED used to make a request for a scheduled event.

As an example, the PSE server in the foregoing example may have determined that the recently detected ED with the range of the PSE wireless network contains a PN credential that corresponds to the scheduled event. The appearance of the ED at the location at a specific time on a specific date with the associated PN credential may be correlated with information regarding the scheduled event in the server log. The PSE server may receive the PN credential stored in the ED in connection with the electronic invite.

At 412, the one or more processors determine if the credentials are valid. For example, an ED within a PSE network range may have a PN credential stored and presented to the PSE server that corresponds to PSE network access during a two-hour layover in an airport. The one or more processors may analyze dates, times, and/or locations in a scheduling program to determine validity of the PN credential. The one or more processors may determine that the PN credential is valid based on the analyzed factors and grant access to the PSE network. The method may proceed to 414. In another example, the one or more processors may determine that a PN credential is invalid based on the ED being located at the wrong airport, an incorrect location factor. An invalid PN credential directs the process to 418

At 418, however, the one or more processors determine if the PN credential is associated with a very important person (VIP). For example, the VIP may be a member of a frequent flyer program that overlooks whether the PN credential is invalid, expired, or does not match scheduled event information. As another example, the VIP may be an employee of an associated travel company that is subject to having frequent changes to scheduled events. The VIP may be registered in a database in the PSE server that overlooks whether the PN credential is invalid, expired, or does not match scheduled event information. However, the one or more processors may not overlook whether the PN credential is invalid, expired, or does not match scheduled event information if the credentials are not associated with a VIP. Network access may be denied based on the issues with the PN credential.

The one or more processors may determine whether the invalid PN credential may be overlooked due to a status of the ED user. If the invalid credential does not pass muster, the process goes to 419.

At 419, the one or more processors may deny access to the PSE network and direct the one or more processors back to 402.

At 414, the one or more processors determine if the PN credential is expired. For example, an ED within a PSE network range may have a PN credential stored and presented to the PSE server that corresponds to PSE network access during a meeting at a hotel during a three-hour window on a specific date. The one or more processors may analyze dates and times stored in a scheduling program to determine whether the PN credential has expired. The one or more processors may determine that the PN credential is valid based on the analyzed dates and times and proceed to 416. In another example, the one or more processors may determine that a PN credential has expired based on the ED returning to the same hotel one day later, an incorrect date factor. An expired PN credential directs the process to 418.

At 418, the one or more processors may determine whether the expired credential may be overlooked due to a status of the ED user. If the expired credential does not pass muster, the process goes to 419.

At 419, the one or more processors may deny access to the PSE network and direct the one or more processors back to 402.

At 416, the one or more processors determine if the PN credential matches the scheduled event details. For example, an ED within a PSE network range may have a PN credential stored and presented to the PSE server that corresponds to PSE network access during a flight that spans five hours on a specific date. The one or more processors may analyze dates, times, flight numbers, and locations in a scheduling program to determine whether the PN credential matches the details of the flight. The one or more processors may determine that the PN credential matches the details of the flight based on the analyzed dates, times, flight numbers, and locations. The process may proceed to 420. In another example, the one or more processors may determine that a PN credential does not match the details of the flight based on the ED not being present on an original flight, an incorrect time and flight number factor. A PN credential that does not match the details of the flight directs the process to 418.

At 418, the one or more processors may determine whether a PN credential that does not match the details of the scheduled event may be overlooked due to a status of the ED user. If the PN credential does not pass muster, the process goes to 419.

At 419, the one or more processors may deny access to the PSE network and direct the one or more processors back to 402.

At 420, the method may include granting the ED access to the PSE network based on the PN credential. For example, if the PSE server has conveyed a PN credential to an ED and the PN credential conforms to the factors associated with the scheduled event, the one or more processors may grant access to the PSE network.

FIG. 5 illustrates a confirmation screen of an ED for connecting to a wireless network in accordance with receiving a PN credential. For example, the ED 502 may be a mobile phone, such as an Apple iPhone, Samsung Galaxy, and the like. The scheduled event may be a cruise to Jamaica between Christmas (T1) and New Year's Day (T2). The PSE 105 may be a cruise ship on which the cruise takes place. Using an application from the cruise line, the traveler may book the cruise. The traveler may search various dates before choosing the week between T1 and T2. Further, the application may present the traveler with a selection of options regarding wireless connectivity during the excursion. Some options may include whether or not the traveler would prefer having internet connectivity in the airport, airplane, and/or cruise ship. The traveler may prefer having basic wireless connectivity (G1) on the cruise ship only. Upon confirming the details of the cruise, the traveler may be presented a confirmation screen 504 as shown in FIG. 5. The click of the confirmation button 506 may trigger a request to the PSE server 115 that results in a PN credential being sent to the traveler via text, email, calendar invite, and the like. The text, email, calendar invite, and the like may contain a PN credential file and information regarding installing the file. Upon following the instructions, the SSID for the cruise ship may be included in the mobile phone Wi-Fi networks. Upon arrival at the cruise ship, the mobile phone may automatically connect to the wireless network 112 of the cruise ship if the PN credentials are valid, not expired, and match the details of scheduled event. If there are issues with the PN credentials, a VIP status of the traveler will likely result in the PN credential issue or issues being overlooked.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
receiving, at an electronic device (ED), an electronic invitation associated with a scheduled event, the electronic invitation including pre-authorization network (PN) credentials for access to a wireless network, the PN credentials including password information required for the ED to connect to the wireless network, wherein the electronic invitation is received at the ED while the ED is outside of a range of the wireless network; and
storing the PN credentials on the ED in association with the scheduled event, the PN credentials to be utilized by the ED to access the wireless network while the ED is within the range of the wireless network.

2. The method of claim 1, further comprising storing the PN credentials on the ED with one or more of location information or date information related to the scheduled event, prior to the scheduled event.

3. The method of claim 1, wherein the electronic invitation includes the PN credentials and one or more of a location or a time associated with the scheduled event.

4. The method of claim 1, wherein storing the PN credentials comprises importing the PN credentials onto a prestored list of credentials associated with different wireless networks, the PN credentials including an identifier of the wireless network.

5. The method of claim 1, wherein the method further comprises determining that the ED is within the range of the wireless network, wherein the determining further comprises one or more of: i) detecting a SSID for the wireless network, ii) utilizing GPS data to identify when the ED is at a location associated with the scheduled event, or iii) determining that a current location of the ED corresponds to a location of the scheduled event.

6. The method of claim 1, further comprising communicating, via the ED, a request associated with the scheduled event, and the electronic invitation is received in response to communicating the request, wherein the electronic invitation and the PN credentials are remotely generated by a server associated with the wireless network for a physical structural environment (PSE) corresponding to a location of the scheduled event.

7. The method of claim 1, further comprising, prior to the storing, comparing the PN credentials that are received to one or more of a calendar invitation, an electronic mail message, a text message, a current location of the ED, or a current date, and determining whether to import the PN credential to the ED based on the comparison.

8. The method of claim 7, wherein the ED represents a first ED, the method further comprising communicating the PN credentials to one or more secondary EDs that have access to one or more of a common calendar, an electronic mail account, or a text messaging account associated with the first ED.

9. The method of claim 1, further comprising presenting, via the ED, at least the password information of the PN credentials to a network device associated with the wireless network while the ED is within the range for the ED to gain access to the wireless network.

10. A method, comprising:
conveying, by one or more servers, an electronic invitation to an electronic device (ED), wherein the electronic invitation is associated with a scheduled event and includes pre-authorization network (PN) credentials to permit the ED access to a wireless network, wherein the PN credentials include password information required for the ED to connect to the wireless network and the electronic invitation is conveyed to the ED while the ED is outside of a range of the wireless network; and
granting, by the one or more servers, the ED access to the wireless network in response to the ED providing at least the password information of the PN credentials while the ED is within the range of the wireless network.

11. The method of claim 10, further comprising: identifying, by the one or more servers, a request from the ED that is associated with a scheduled event, wherein the PN credentials are conveyed in response to receiving the request and prior to the scheduled event.

12. A system, comprising:
one or more processors; and
a memory storing program instructions accessible by the one or more processors, wherein, responsive to execution of the program instructions, the one or more processors are configured to:
convey an electronic invitation to an electronic device (ED), wherein the electronic invitation is associated with a scheduled event and includes pre-authorization network (PN) credentials to permit the ED access to a wireless network, wherein the electronic invitation including the PN credentials is conveyed to the ED while the ED is outside of a range of the wireless network; and
grant the ED access to the wireless network, while the ED is within the range of the wireless network, based on the ED providing the PN credentials.

13. The system of claim 12, wherein, in response to determining that the ED is within the range of the wireless network, the one or more processors receive the PN credentials stored in the ED and determine that the PN credentials stored in the ED are one or more of: i) valid, ii) expired, iii) match current booking information, or iv) associated with a very important person (VIP).

14. The system of claim 13, wherein, responsive to execution of the program instructions, the one or more processors deny access to the wireless network upon determining that the PN credentials stored in the ED are at least one of invalid, expired, or mismatched relative to the current booking information, and that the PN credentials are not associated with a very important person (VIP); and the one or more processors grant access to the wireless network upon determining that the PN credentials stored in the ED are associated with the VIP.

15. The system of claim 12, wherein, responsive to execution of the program instructions, the one or more processors convey the PN credentials to the ED in response to identifying a new request from the ED.

16. The system of claim 12, wherein, responsive to execution of the program instructions, the one or more processors determine whether an old credential is in memory, wherein the old credential is deleted upon detection.

17. The system of claim 12, wherein, responsive to execution of the program instructions, the one or more processors record position data of the ED in a tracking log and record one or more of a check-in time, a check-out time, network access level, or a room number.

18. A computer program product comprising a non-transitory computer readable storage medium, the non-transitory computer readable storage medium comprising computer executable code configured to be executed by one or more processors to:
convey an electronic invitation to an electronic device (ED) while the ED is outside of a range of a wireless network, wherein the electronic invitation is associated with a scheduled event and includes pre-authorization network (PN) credentials to permit the ED access to the wireless network while the ED is within the range of the wireless network, the PN credentials including password information required for the ED to connect to the wireless network; and
grant the ED access to the wireless network in response to the ED providing at least the password information of the PN credentials while the ED is within the range of the wireless network.

19. The computer program product of claim 18, wherein the computer executable code is further configured to be executed by the one or more processors to:
receive the PN credentials from the ED in connection with an invitation confirmation while the ED is within the range of the wireless network;
determine whether the PN credentials received in connection with the invitation confirmation are valid;
determine whether the PN credentials received in connection with the invitation confirmation are expired;
determine whether the PN credentials received in connection with the invitation confirmation match current booking information; and
determine whether the PN credentials received in connection with the invitation confirmation are associated with a very important person (VIP).

20. The computer program product of claim 19, wherein the computer executable code is further configured to be executed by the one or more processors to one or more of:
- deny access to the wireless network upon determination that the PN credentials received in connection with the invitation confirmation are invalid;
- deny access to the wireless network upon determination that the PN credentials received in connection with the invitation confirmation are expired;
- deny access to the wireless network upon determination that the PN credentials received in connection with the invitation confirmation are mismatched relative to the current booking information; and
- grant access to the network upon determination that the PN credentials received in connection with the invitation confirmation are associated with the VIP, regardless of whether the PN credentials received in connection with the invitation confirmation are determined to be invalid, expired, or mismatched.

* * * * *